(12) United States Patent
Rostan

(10) Patent No.: US 6,414,272 B2
(45) Date of Patent: Jul. 2, 2002

(54) CONTROL DEVICE WITH SEVERAL STABLE POSITIONS, ESPECIALLY FOR A CIGAR LIGHTER

(75) Inventor: Philippe Rostan, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 0 days.

(21) Appl. No.: 09/725,527

(22) Filed: Nov. 29, 2000

(30) Foreign Application Priority Data

Nov. 30, 1999 (FR) .............................. 99 15070

(51) Int. Cl.⁷ .................................. F23Q 7/22
(52) U.S. Cl. .......................... 219/267; 219/265
(58) Field of Search ................. 219/267, 265, 219/240, 241, 270, 268, 262; 200/566, 533

(56) References Cited

U.S. PATENT DOCUMENTS

| | | | | |
|---|---|---|---|---|
| 4,079,242 A | * | 3/1978 | Seibel ........................ | 362/311 |
| 4,713,733 A | * | 12/1987 | Fitz et al. .................. | 219/220 |
| 5,029,048 A | * | 7/1991 | von Gaisberg et al. ..... | 219/269 |
| 5,223,695 A | | 6/1993 | Merchel et al. | |
| 5,493,098 A | * | 2/1996 | Diedrich .................... | 219/265 |
| 5,780,813 A | * | 7/1998 | Sire et al. .................. | 219/265 |
| 5,796,073 A | * | 8/1998 | Mattis et al. ............... | 219/265 |
| 5,828,967 A | * | 10/1998 | Mathieu ...................... | 362/26 |
| 5,831,246 A | * | 11/1998 | Thivet ........................ | 219/265 |
| 5,928,539 A | | 7/1999 | Thivet | |

FOREIGN PATENT DOCUMENTS

DE            3642833           6/1987

OTHER PUBLICATIONS

French Search Report dated Aug. 3, 2000.

* cited by examiner

Primary Examiner—Teresa Walberg
Assistant Examiner—Vinod D. Patel
(74) Attorney, Agent, or Firm—Morgan & Finnegan, LLP

(57) ABSTRACT

A control device with several stable positions, has a cam and a finger, the finger traveling along a cam track around the cam, when the finger and the cam are moved with respect to one another in translation. The cam track has curvature about an axis of rotation parallel to the axis of the translation to move the finger and the cam in rotation with respect to one another.

The finger and the cam each are a cylindrical ring, these two rings being coaxial and capable of a rotational movement with respect to one another, along the axis of rotation.

14 Claims, 9 Drawing Sheets

FIG_1a
PRIOR ART

FIG_1b
PRIOR ART

FIG_2a
PRIOR ART

FIG_2b
PRIOR ART

FIG_2d
PRIOR ART

FIG_2c
PRIOR ART

FIG_3
PRIOR ART

FIG_6

FIG_7

FIG_8

FIG_10a

FIG_10b

FIG_12

CONTROL DEVICE WITH SEVERAL STABLE POSITIONS, ESPECIALLY FOR A CIGAR LIGHTER

FIELD OF THE INVENTION

The invention relates to the field of control devices with several stable positions, especially for motor vehicles. More precisely, what are involved are devices intended to be used as on-off switches, changeover switches, pushbuttons, etc.

BACKGROUND OF THE INVENTION

Figure 1A:
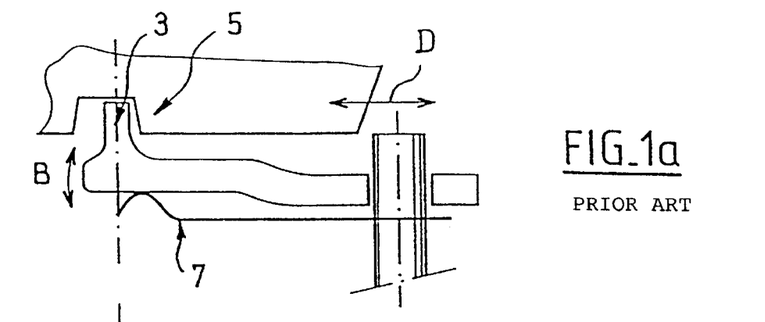
Figure 1B:
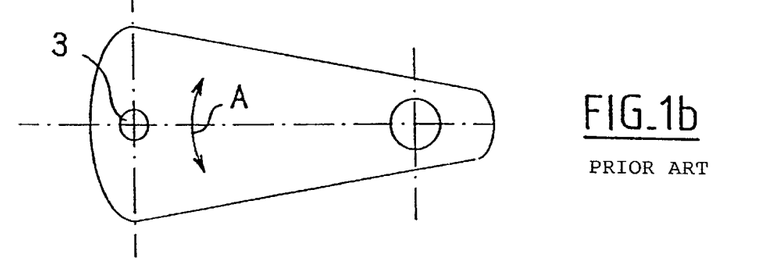

Bistable mechanical switches are already known (air-conditioning controls, warning light controls, etc.) comprising a finger 3 and a heart-shaped cam 5. Their principle is illustrated diagrammatically in FIGS. 1a and 1b. When these switches are actuated, the finger 3 and the cam 5 are in shifted in translation, with respect to one another (movement D, FIG. 1a). In the course of this translation, the finger 3 is guided around the cam 5, on a cam track in a single direction, with an auxiliary movement (movement A, FIG. 1b) on the flat, in a plane parallel to the direction of operation of the button of the switch. In order to follow the cam track, the finger 3 undergoes rotation about an axis perpendicular to that of translation (movement D). The finger 3 of this type of device is, moreover, permanently applied, by virtue of a spring 7, onto the bottom of the cam track which features a variable altitude and implies a shifting of the finger 3 perpendicularly to the direction of operation of the button of the switch (movement B, FIG. 1a).

One object of the invention is to furnish a control device with several stable positions, less bulky than those described above.

SUMMARY OF THE INVENTION

This object is achieved by virtue of a control device with several stable positions, comprising a cam and a finger, the finger traveling along a cam track around the cam, when the finger and the cam are moved with respect to one another in translation, the cam track exhibiting curvature about an axis of rotation parallel to the axis of the translation in order, during the translation, to move the finger and the cam in rotation with respect to one another, wherein the rotational movement of the cam and of the finger, with respect to one another, is achieved by virtue of the fact that the finger and the cam each respectively consist of a cylindrical ring, these two rings being coaxial and capable of a rotational movement with respect to one another. In fact, with devices such as buttons themselves often having an axisymmetric cylindrical shape, the two rings can easily be incorporated into the device. Moreover, with the two rings being coaxial, one situated inside the other, the device according to the invention is remarkably compact.

Advantageously, the finger is guided on the cam track by virtue of a stud mounted on an elastic tab and made of the same material as the ring on which it is located. This makes it possible, by not using a strip or spring to apply the finger to the bottom of the cam track (as in the prior art presented above), to limit the number of pieces of the device. This facilitates assembly thereof, and makes it less expensive to manufacture.

Advantageously also, the control device according to the invention comprises at least one end stop for taking up the substantial forces exerted on the device, along the translation axis. By virtue of this end stop, the user can exert very substantial force parallel to the translational axis of the device without damaging the cam or the finger. The number of end stops may be greater than 1.

Advantageously, the device according to the invention includes a spring providing a permanent force for bringing the finger into abutment on the cardioid cam, in the stable positions.

According to another aspect, the invention is a cigar lighter.

Figure 2A:
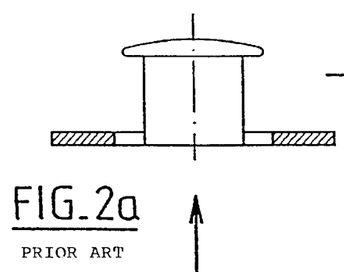
Figure 2B:
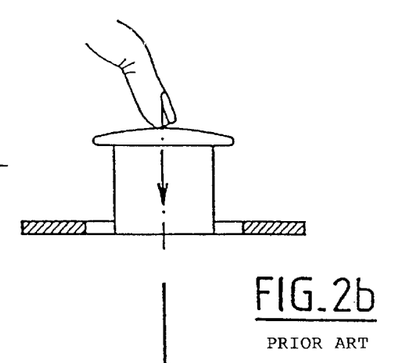
Figure 2C:
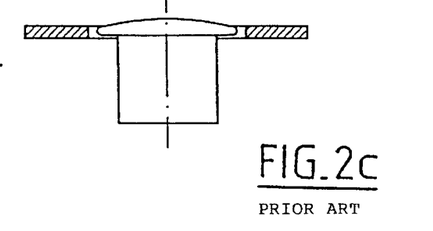
Figure 2D:
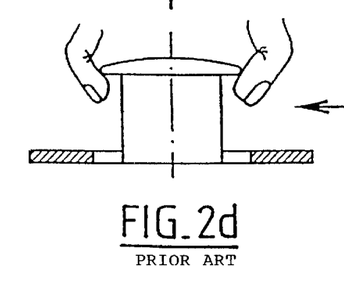

Cigar lighters including pushbuttons are already known, on which it is possible to press or which are pulled. The operation of a cigar-lighter button of the prior art, of this type, is illustrated in FIGS. 2a and 2d. It protrudes from the dashboard on which the cigar lighter is mounted, when the latter is not being used (FIG. 2a). This position corresponds to a rest position. Pressure is exerted on the pushbutton in order to set the cigar lighter to heating mode (FIG. 2b). The button remains pushed in during the period of heating in a power-supply unit (FIG. 2c). At the end of the heating period, the button rises back up and again becomes proud of the dashboard so that the user can use the heating assembly integral with the button (FIG. 2d). This position of the button is identical to the rest position described above (FIG. 2a). In this position, the user can also pull on the button in order to extract the heating assembly from the power supply unit of the cigar lighter so as to use the unit as a power socket.

This type of control device exhibits the drawback of protruding, in rest position, from the surface on which it is mounted.

Another object of the invention is to furnish a cigar lighter not exhibiting this drawback.

This object is achieved by virtue of a cigar lighter intended to be mounted on a dashboard, especially of a motor vehicle, comprising a power-supply body and a removable, heating pushbutton, and including a pushing surface, the button being able to occupy a first position in the unit, in which it is at least partly projecting with respect to the sweep of the dashboard, in order to be grasped and extracted from the unit, and a second position in which the button can be heated, wherein the button is, moreover, able to take up a third, stable position in which it is not heated and where the pushing surface follows the sweep of the dashboard.

Advantageously then, the cigar lighter according to the invention further includes a cam and a finger, the finger traveling along a cam track around the cam, when the finger and the cam are moved with respect to one another, in translation. Also advantageously, the cam track features a curvature around an axis of rotation parallel to the axis of the translation for moving the finger and the cam in rotation with respect to one another during the translation.

Advantageously, in this case, the cigar lighter comprises a gripping button fixed to the finger with the aid of a pivot link formed by virtue of countersunk clips. This makes it possible to limit the number of pieces to be assembled in order to form a button in accordance with the present invention.

Advantageously, the pushbutton of the cigar lighter is in three parts which are a gripping button, a finger and a cam.

BRIEF DESCRIPTION OF THE DRAWINGS

Other aspects, objects and advantages of the invention will emerge on reading the detailed description which follows. The invention will also be better understood with the help of the references to the drawings on which:

FIGS. 1a and 1b are diagrammatic representations of the finger-cam system of a control device of the prior art; FIG.

1*a* is a sectional view along the longitudinal axis of the finger, in a plane parallel to the axis of rotation of the finger; FIG. 1*b* is a top view of the finger represented in FIG. 1*a*;

FIGS. 2*a* to 2*d* are diagrammatic representations of a cigar-lighter button of the prior art, in a section parallel to the axis of the translation along which the button is pressed; FIG. 2*a* corresponds to the position of this button of the prior art when it is at rest; FIG. 2*b* corresponds to the button of FIG. 2*a* when it is pressed; FIG. 2*c* corresponds to the button of FIGS. 2*a* and 2*b*, when it is in heating position; FIG. 2*d* corresponds to the button of FIGS. 2*a* to 2*c*, when the user exerts a pulling force on it in order to extract it from the dashboard;

FIGS. 9*a* to 9*g* are diagrammatic representations of the pushbutton of the cigar lighter represented in FIG. 4, along a section parallel to the axis of the translation along which this button is pressed, FIG. 9*a* corresponds to the position of this button when it is at rest; FIG. 9*b* corresponds to the button of FIG. 9*a* when it is lightly pressed; FIG. 9*c* corresponds to the button of FIGS. 9*a* and 9*b* when it is in position to be pulled and extracted from the dashboard on which the cigar lighter in accordance with the invention is mounted; FIG. 9*d* corresponds to the button of FIGS. 9*a* to 9*c*, when it is in position in which it is pressed so as to be brought back into rest position; FIG. 9*e* corresponds to the button of FIG. 9*a* when it is pressed to the bottom; FIG. 9*f* corresponds to the button of FIGS. 9*a* to 9*e* when it is in heating position; FIG. 9*g* corresponds to the button of FIGS. 9*a* to 9*g* when it again comes out of the dashboard at the end of the heating period;

FIGS. 10*a*, 10*b* and 10*c* are sectional representations of the pushbutton represented in FIG. 4; FIG. 10*a* corresponds to this pushbutton in a first stable position; FIG. 10*b* corresponds to this pushbutton in a second stable position; FIG. 10*c* corresponds to the pushbutton in the position of FIG. 10*b*, but turned by 90° on the axis O—O with respect to the latter;

FIG. 11 is a representation in perspective according to an exploded view of a variant of the pushbutton in accordance with the present invention.

DESCRIPTION OF THE PREFERRED EMBODIMENT

The invention is described below in detail, in the context of a particular but non-limiting example. According to this example, the device according to the invention constitutes the pushbutton of a cigar lighter for vehicles, especially motor vehicles.

In the various figures, like reference numerals indicate like parts.

One particular but non-limiting embodiment of the cigar lighter 1 in accordance with the present invention will be described in a detailed way below in connection with FIGS. 3 to 10.

This involves a cigar lighter 1, to be sunk into a dashboard 2 of a motor vehicle. It comprises a power-supply body 4, a heating plug 6, a connection module 8, an illuminating ring 10 and a lighting module 12 (FIGS. 3 and 9*a* to 9*g*).

Figure 3:
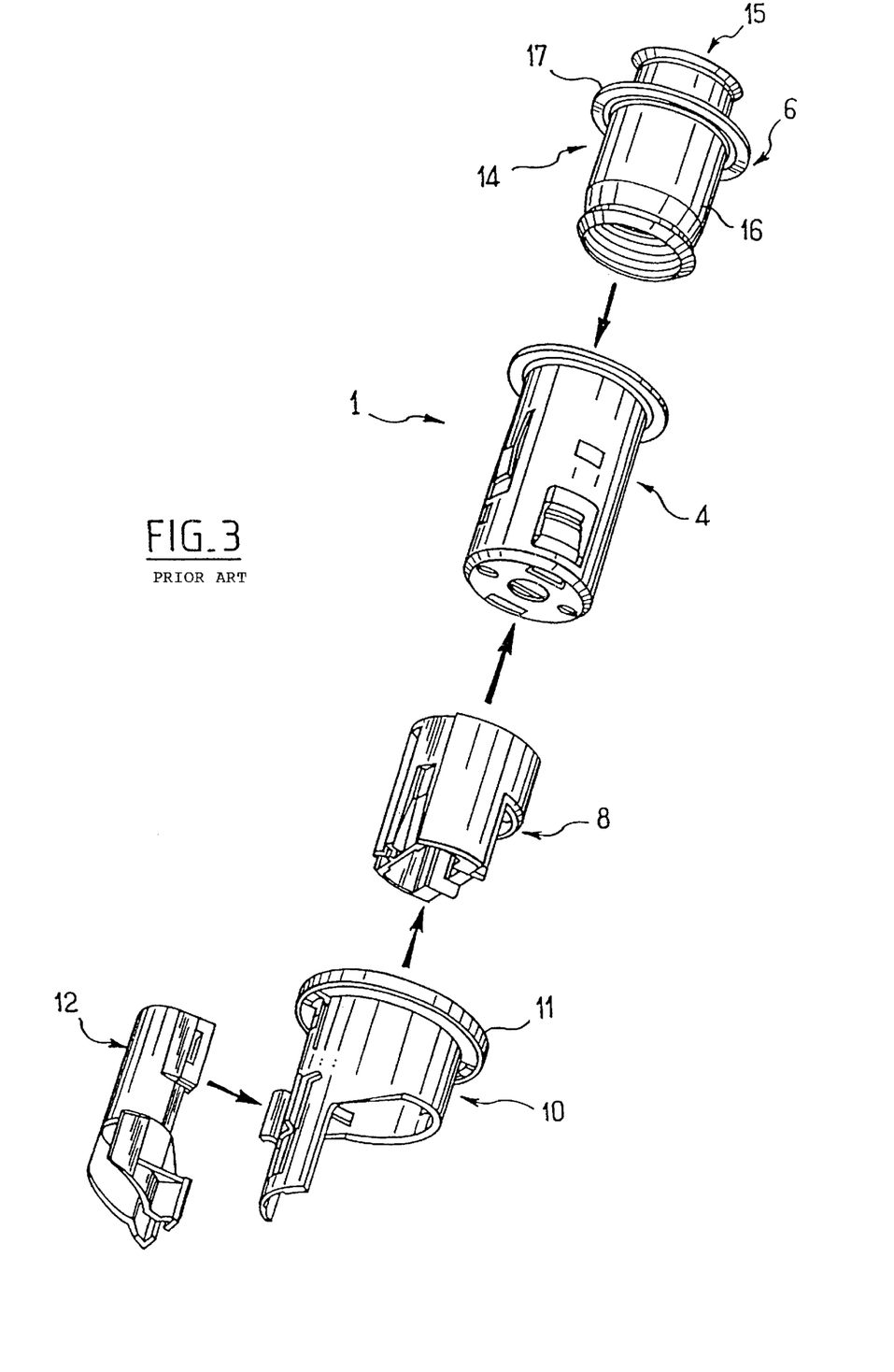
FIG. 3 is a side view in perspective, in an exploded representation, of a cigar lighter in accordance with the present invention.

The power-supply body 4 includes a socket serving as a receptacle for the plug 6 and equipped internally with a current outlet for electrically powering a heating resistance element wound in a spiral in the plug 6.

The connection module 8 axially extends the power-supply body 4 and is carried on the latter. The connection module 8 electrically powers the power-supply body 4, by virtue of an electrical harness forming the electrical link between the general circuit of the vehicle and the connection module 8.

The illuminating ring 10 surrounds the power-supply body 4, allows the latter to be fixed onto the dashboard 2 and, by virtue of a collar 11, produces a ring of light on it for identifying the cigar lighter 1 at night.

The lighting module 12 is mounted so as to protrude from the illuminating ring 10.

A description of an embodiment of the power-supply bodies 4, connection module 8, illuminating ring 10 and lighting module 12, as they are mentioned above, will be found in the document FR 2 758 111.

The plug 6 includes two parts axially moveable with respect to one another counter to a helical spring.

In fact one, 14, of these parts is fixed when the plug 6 is in place in the power-supply body 4 while the other 15 is able to be moved in translation with respect to the fixed part 14. The fixed part 14 essentially includes an ash guard 16 and a ring 17. The ring 17 constitutes thermal protection for the user's fingers and an aesthetic element. The ash guard 16 surrounds a heating body, not represented, and guides the insertion of the plug 6 into the power-supply body 4. For a more complete description of the fixed part 14, reference may be made for example to the document FR 2 758 111. The moveable part 15 includes the heating body and a pushbutton 18.

The heating body includes a heating resistance element wound in a spiral within a cup.

Figures 4, 5:
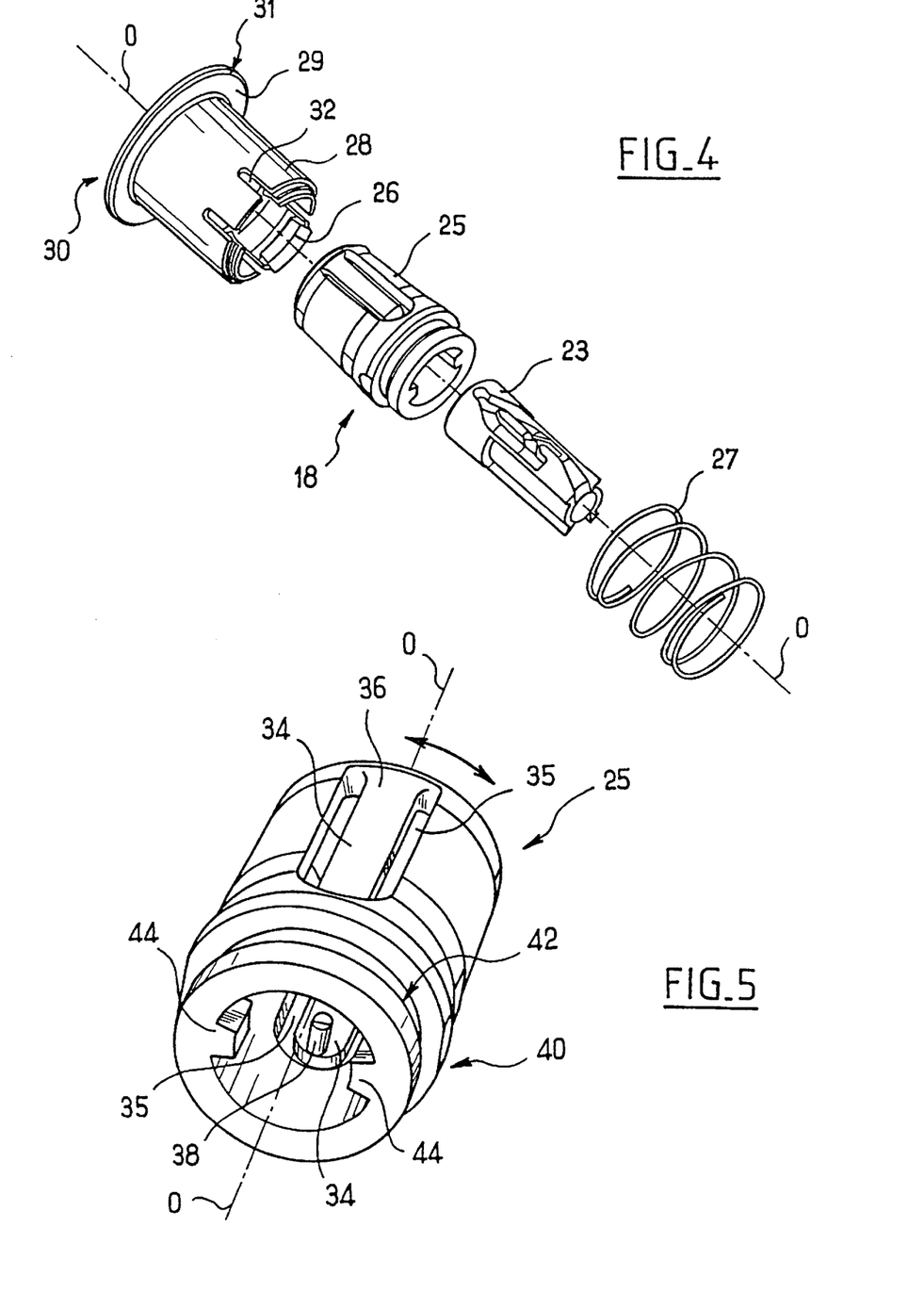
FIG. 4 is a side view, according to an exploded representation, of a pushbutton of the cigar lighter, represented in FIG. 3.
FIG. 5 is a view in perspective of the finger of the pushbutton in accordance with the invention, represented in FIG. 4.

As represented in FIG. 4, the pushbutton 18 includes a spring 27 of helical type, a cam 23, a finger 25 and a gripping button 28.

The cam 23, finger 25 and gripping button 28 each essentially consist of a hollow cylinder. The cylinder of the finger 25 fits into the cylinder of the cam 23. The cylinder of the gripping button 28 fits into that of the finger 25. These three cylinders have a common longitudinal axis O—O.

The cylinder of the gripping button 28 is closed off by a transverse, disc-shaped wall 29. The diameter of this disc is greater than that of the cylinder of the gripping button 28, so as to form a rim 31 offering more effective purchase when the gripping button 28 is pulled on. The outer face of the transverse wall 29 constitutes a pushing surface 30, on which the user presses to actuate the pushbutton 18. The cylinder of the gripping button 28 is equipped, at its free-edge end, with two pairs of slots 32 diametrally opposed in order to allow elastic deformation of the cylinder of the gripping button, between the slots 32 of each pair of slots. The inner face of the cylinder of the gripping button 28, between the two slots 32 of each pair of slots, is equipped with a projecting element having a beveled face, in order to facilitate insertion of the gripping button 28 onto the finger 25, and one face mainly perpendicular to the inner face of the cylinder of the gripping button, in order to serve as an axial end stop to the finger 25, preventing the latter coming out of the gripping button 28. This projecting element and the elastically deformable region of the cylinder of the gripping button 28 form a countersunk clip 26. The free edge of the cylinder of the gripping button 28 is equipped with two recessed features forming two partially cylindrical elements with axis O—O the outer diameter of which is less than the outer diameter of the cylinder of the gripping button, the outer diameter of one of these elements itself being less than that of the other.

The coaxial recessed features with the cylinder of the gripping button 28 form a stepped structure, one of the risers of which, formed by flats extending radially with respect to the axis O—O, serves as an abutment for the spring 27, in particular when it is compressed when pressure is applied to the gripping button 28. This stepped structure which serves for the fixing and the housing of the spring 27, may advantageously be replaced by a chamfer.

As represented in FIG. 5, the finger 25 exhibits axial symmetry of order 2. The cylindrical wall of the finger 25 includes two tabs 34. These tabs 34 are formed by virtue of cut-outs 35 through the cylindrical wall of the finger 25. These cut-outs 35 are U shaped, the branches of the U being parallel to the axis O—O. The free ends of these U branches start from the base 36 of each tab 34, by which the latter is linked to the cylindrical wall of the finger 25. This base 36 is close to one of the free edges of the cylindrical wall of the finger 25. Each tab 34 is made integrally with the cylindrical wall of the finger 25 and extends from the base 36 longitudinally, parallel to this cylindrical wall, towards the other free edge thereof. This other free edge includes a structure 40 for retaining the finger 25 in the gripping button 28.

Each tab 34 has a length and a thickness along the radial direction with respect to the axis O—O such that each tab 34 is capable of elastic deformation in this radial direction.

Each tab 34 includes a stud 38 at its free end, that is to say at its end longitudinally opposite its base 36. This stud 38 consists of a small solid element, made integrally with each tab 34 and extending over a few millimeters from the latter towards the inside of the cylinder of the finger 25. This stud 38 advantageously has an oblong shape in cross section, so as to increase the surface area of contact with the cam 23 in order to limit the contact pressure and thus reduce the wear on rubbing parts.

The retaining structure 40 consists mainly of a circular groove 42 formed on the outer face of the cylindrical wall of the finger 25, centered on the axis O—O. The retaining structure 40 and the clips 26 form a pivot link between the finger 25 and the gripping button 28.

The inner face of the cylinder of the finger 25 is equipped with two diametrally opposed guide ribs 44. Each guide rib 44 extends longitudinally under the region of the cylindrical wall of the finger 25 where the retaining structure 40 is located, and radially over a thickness of the order of one millimeter. These guide means 44 promote the guidance of the movement of the finger 25 on the cam 23.

Figure 6:
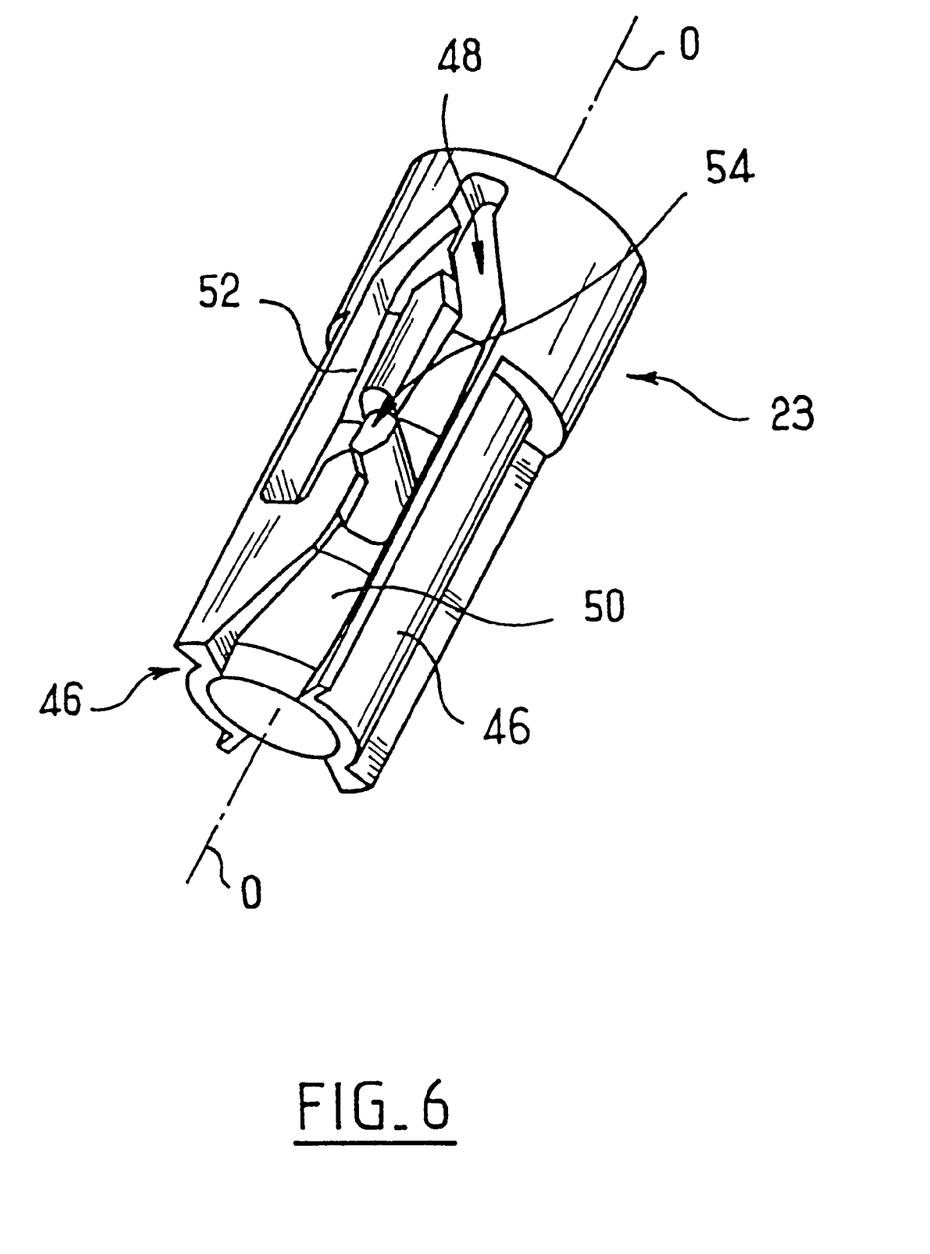
FIG. 6 is a view in perspective of the cam of the pushbutton in accordance with the invention, represented in FIG. 4.

As represented in FIG. 6, the cam 23 consists of a hollow cylinder and exhibits axial symmetry of order 2, with a pair of guide grooves 46 and a pair of cam tracks 48, the elements of each pair being symmetric with one another, with respect to the axis O—O.

Each guide groove 46 consists of a channel formed in the cylinder of the cam 23. This channel extends longitudinally from the free edge of the cylinder of the cam 23, situated on the same side as the retaining structure 40 and of the guide grooves 44, when the cam 23 is fitted into the finger 25. This channel does not extend as far as the other free edge of the cylinder of the cam 23, such that, when the cam 23, the finger 25 and the gripping button 28 are fitted into one another, the cam 23 is blocked longitudinally, on the one hand, by the transverse wall 29 and, on the other hand, by the guide ribs 44 abutting on the bottom of the guide grooves 46.

These guide grooves 46 have a width, along the outer circumference of the cylinder of the cam 23, which is sufficient to allow rotation of the finger 25 and the cam 23 with respect to one another, which is necessary for the studs 38 to travel over the whole of the cam tracks 48.

Each cam track 48 also consists of a channel formed in the cylinder of the cam 23. This channel has a U shape, one branch of which is longer than the other. The part of each cam track 48 corresponding to the longer branch 50 extends longitudinally from the free edge of the cylinder of the cam 23, situated on the same side as the retaining structure 40 and of the guide grooves 44, when the cam 23 is fitted into the finger 25. This channel does not extend as far as the other free edge of the cam 23, but describes a hairpin turn so as to form the base of the U.

The shorter branch of the U, 52, comes back parallel to the longer one. The two branches 50, 52 communicate with each other via a passage 54 situated before the end of the shorter branch 52.

Figure 7:
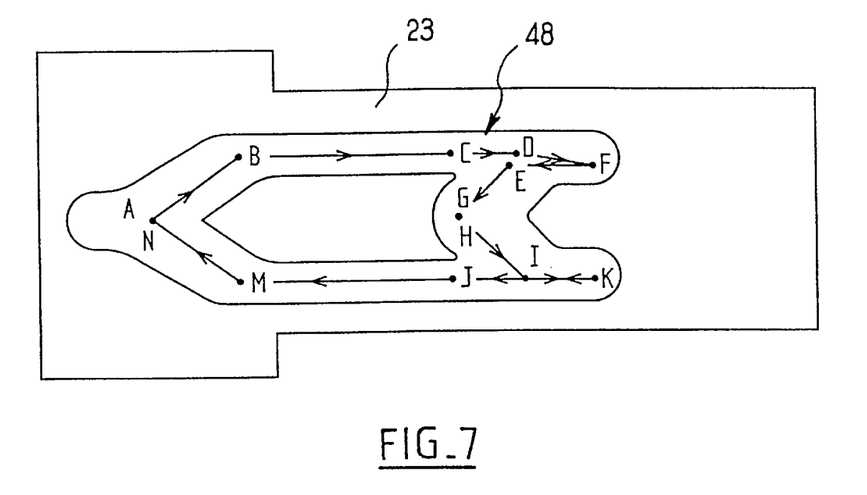
FIG. 7 is a diagrammatic representation of the cam track, laid flat, of the cam represented in FIG. 6.

The channel of the cam track 48 features variable depth. FIG. 7 diagrammatically represents the cam track 48, in a plan view. The cam 23 is a cardioid cam, the cam track 48 is heart shaped. The letters A to N indicate various successive positions of a stud 38 on a cam track 48.

Figure 8:
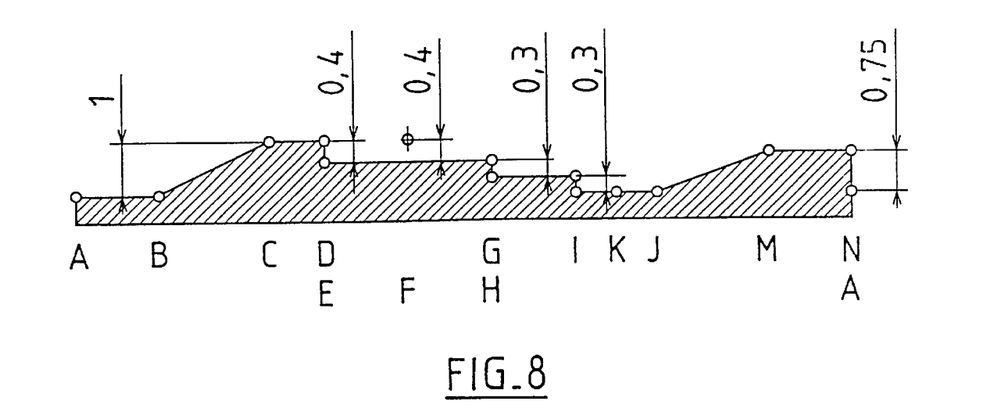
FIG. 8 diagrammatically represents the variations in altitude of the pushbutton finger represented in FIG. 4, in the cam track represented in FIG. 7.

FIG. 8 diagrammatically represents the profile of the variations in altitude of a stud 38, in a cam track 48, as a function of the various positions A to N of FIG. 7.

If 1 is taken as the scale, the maximum amplitude of the variation in altitude along the cam track 48, point A is at altitude 0.

When the gripping button 28 is pressed, the stud altitude 0 to altitude 1, then from C to D, while remaining at altitude 1.

The stud 38 can travel along the cam track 48, between A and D, reversibly; If the pressure on the gripping button 28, counter to the spring 27, is released, the stud 38 comes back to A, under the effect of the return force of the spring 27.

In contrast, if the gripping button 28 is pushed in further into the dashboard 2, the stud 38 is lowered to the altitude 0.6 from D to E.

The passage from D to E takes place in a step or along a ramp the slope of which is sufficiently steep that, on this portion of the cam track 48, the shifting of the stud 38 takes place irreversibly. That is to say that, if the pressure is released on the gripping button 28, the stud 38 cannot come back towards B, despite the force supplied by the spring 27.

If the gripping button 28 is released, the stud 38 passes from E to G then to H, along a single track since the altitude decreases down to 0.3 at H, and since the slope between G and H is such that the stud 38 cannot come backwards. In contrast, if the gripping button 28 is pushed further into the dashboard 2, the cam 23 comes into abutment against the transverse wall 29, when the stud 38 is at F. When the user releases the pressure, the stud 38 comes back to E then to H, as previously described.

At H, the cam 23 is in stable position in the finger 25 since, on the one hand, the altitude at H is lower than at G and, on the other hand, the passage 54 features a concave surface able to retain the stud 38 when it comes from the position E under the effect of the return force of the spring 27.

From this stable position H, if the user again presses on the gripping button 28, with the stud 38 being unable to come backwards from H to G, it comes back towards I which is at altitude 0. If the user continues to push in the gripping button 28, the stud arrives at the position K, at which the cam 23 comes into abutment against the transverse wall 29.

When the user releases the gripping button 28, the stud 38 comes back to I, to J, then M, at the altitude 0.75, under the effect of the return force of the spring 27.

The slope between J and M is sufficiently slight for the stud 38 to be able to travel this journey under the effect of the return force of the spring 27 alone. Having reached M, the stud 38 spontaneously comes back to N, then to A, under the effect of the return force of the spring 27, the altitude between M and N being unvarying, and that between N and A decreasing rapidly down to 0. At A, the stud 38 cannot come backwards, towards N, since the slope between A and N is too steep.

In position A, the guide ribs 44 are in abutment at the bottom of the guide grooves 46 and the spring 27 keeps the cam 23 and the finger 25 thus in abutment. The cam 23/finger 25 assembly is then in another stable position. This situation can be altered only if the user again presses on the gripping button 28.

The stud 38 is thus ready for a new A-N cycle like the one described above.

The free end of the stud 38, during the travel A-N described above, is constantly in contact with the bottom of the channel of the cam track 48, thanks to the elasticity of the tab 34.

When the user presses the gripping button 28, or when the return force of the spring 27 takes action, the stud 38 exerts, on the sidewalls of the channel forming the cam track 48, a force which tends to make the finger 25 move in rotation with respect to the cam 23, about the axis O—O. This is the case especially from A to B, from E to G, from H to I and from M to N.

The various positions of the cam track 48 described above correspond to different positions of the gripping button 28 with respect to the dashboard 2. This is illustrated by FIGS. 9a to 9g.

Figures 9A, 9B, 9E:
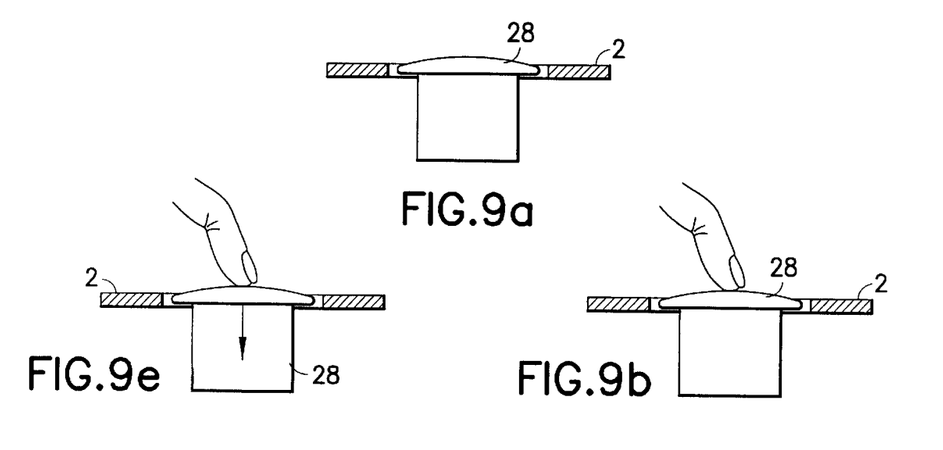
Figure 9C:
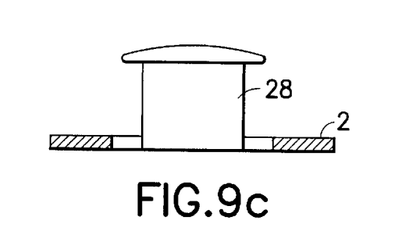

FIG. 9a corresponds to the stable position H. If the user presses lightly on the gripping button 28 (FIG. 9b), the stud 38 passes from H to I or K. When the user then releases the pressure on the gripping button 28, the stud 38 passes from I or K to A. In this position, the gripping button 28 is projecting from the dashboard 2 (FIG. 9c). The plug 6 can then be extracted from the power-supply body 4, by pulling on the gripping button 28, in order to plug another object, such as a charger for a mobile telephone, into the power-supply body 4 or light a cigar or a cigarette.

The user can then also again press on the gripping button 28 (FIG. 9d), the stud 38 then passes from position A to D or F, then to E when the user releases his pressure so as to come back to the stable position H, in which the gripping button 28 is flush with the surface of the dashboard 2 (FIG. 9a).

Starting from the stable position H (FIG. 9a), the user, if he wishes to light a cigarette or a cigar, can proceed differently. He presses on the gripping button 28 but, when the stud 38 arrives in the position K and when the finger 25 and the cam 23 are in abutment, the user continues to push in the gripping button 28 into the dashboard 2 (FIGS. 9a). The plug 6 then functions as a conventional cigar lighter. The cup in which the heating resistance element is located remains (FIG. 9f) held in a bimetallic strip which releases the plug 6 only when the heating resistance element is at the desired temperature. When the user releases his pressure on the gripping button 28, the stud comes back into position A, in which the gripping button 28 comes flush, for example, with the surface of the dashboard 2, whereas the cup remains snagged in the bimetallic strip.

Figure 9D:
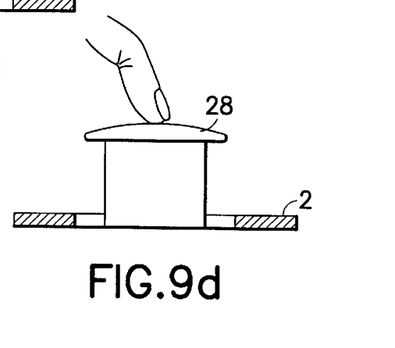
Figure 9F:
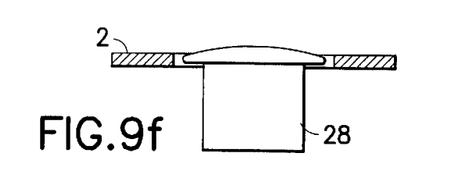

Finally, when the heating resistance element is at the desired temperature, the cup rises back up and the gripping button 28, which was held onto the cup by a catch 56, rises back above the surface of the dashboard 2, so that the user can extract the plug 6 from the power-supply body 4 (FIG. 9g). When the user puts the plug 6 back in place in the power-supply body 4, all he has to do is to again push on the gripping button 28 (FIG. 9d). The stud 38 travels along the track A to F. With the finger 25 and the cam 23 being in abutment, the user can replace the plug 6 in the power-supply body 4. When the user releases his pressure, the stud 38 comes back to H, and the gripping button 28 comes flush with the surface of the dashboard 2 (FIG. 9a).

Figure 10A:
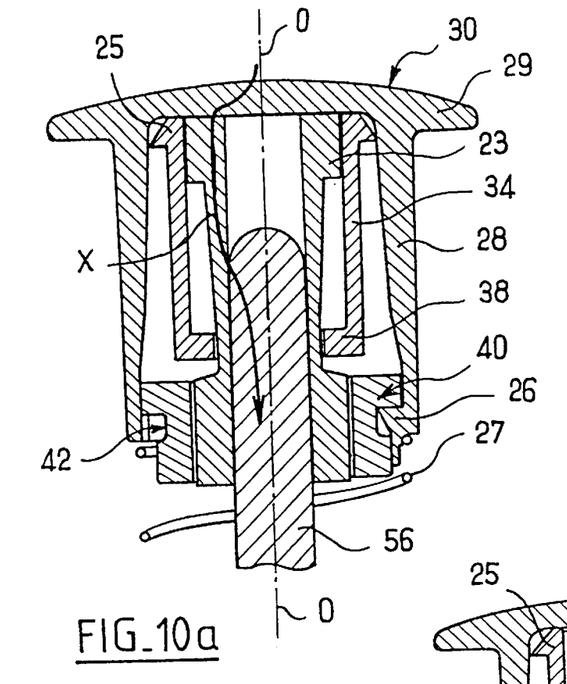
Figure 10B:
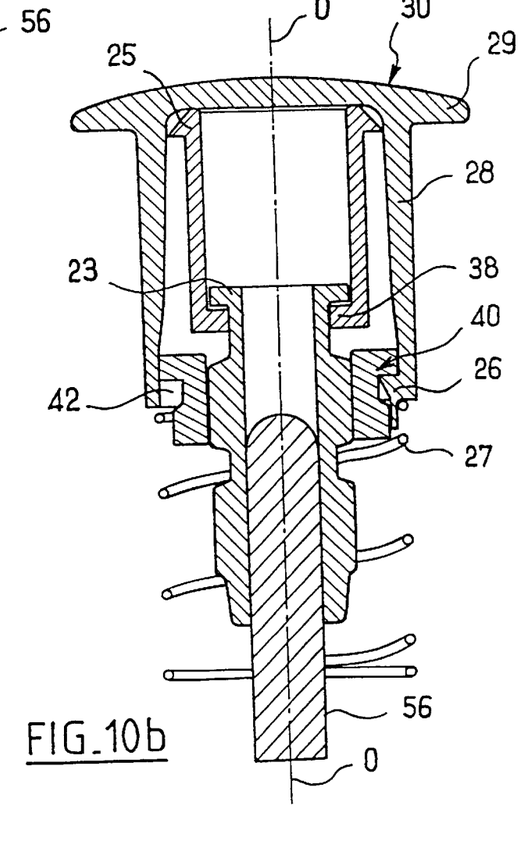
Figures 10C, 11:
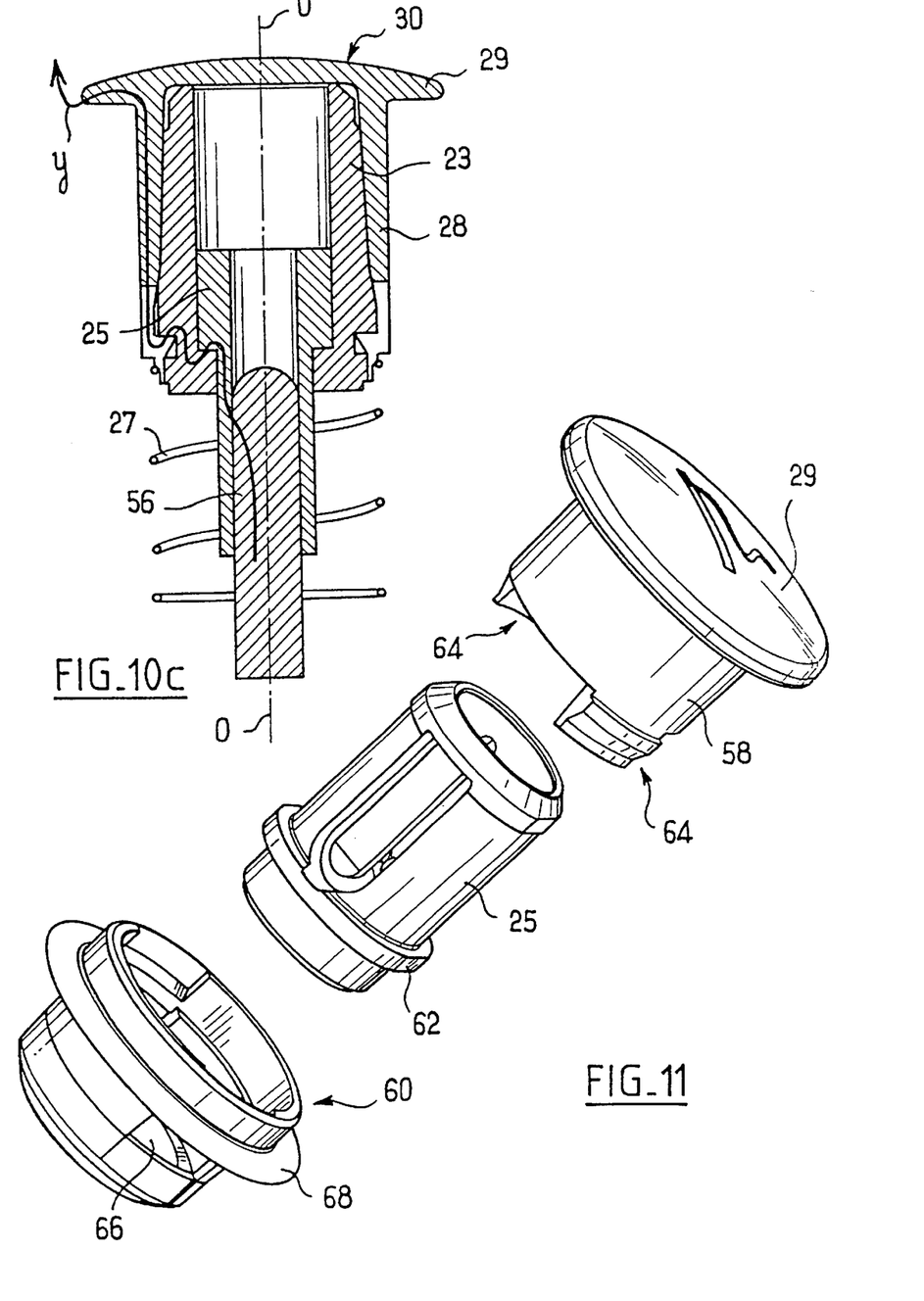

FIGS. 10a, 10b and 10c diagrammatically illustrate the respective positions of the finger 25 and of the cam 23 when the stud is in the positions A and H. Here it can clearly be seen that the cam 23 is in abutment against the transverse wall 29, in FIG. 10a. The sectional planes of FIGS. 10a and 10b are turned by 90° with respect to one another. Hence it is seen that the finger 25 is held in the gripping button 28, but that it has turned about the axis O—O between the positions corresponding respectively to FIGS. 10a and 10b. The sectional plane corresponding to FIG. 10c is turned by 90° about the axis O—O, by comparison with that of FIG. 10b.

Hence, as described above, the cam track 48 is delimited longitudinally by two end stops. One of these ends stops corresponding to the contact between the cam 23 and the transverse wall 29 (FIG. 10a) and the other corresponding to contact between the guide ribs 44 at the bottom of the guide grooves 56 (FIG. 10c). These end stops are such that, in the corresponding positions, it is not the stud 38 itself which limits the relative movements of the finger 25 with respect to the cam 23. Hence, when the user presses the gripping button 28, when he extracts the plug or heating body 4 or when the return force of the spring 27 takes action, he does not exert on the stud 38 stresses directed parallel to the longitudinal axis O—O.

The arrows X (FIG. 10a) and Y (FIG. 10c) indicate respectively the force transmission paths when the user presses on the gripping button 28 or extracts it from the dashboard 2. These arrows X and Y pass through the ends stops indicated above.

Figure 12:
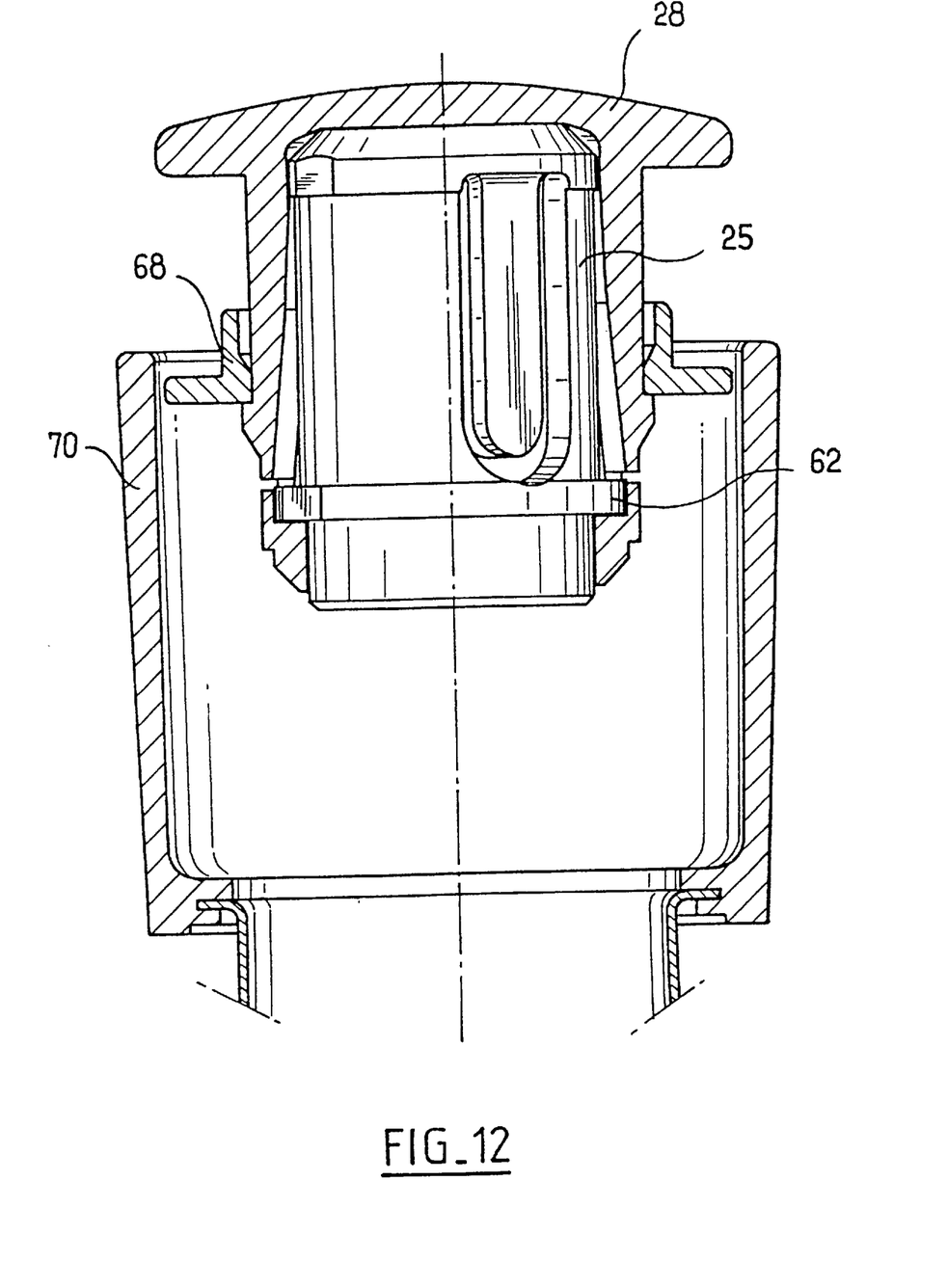
FIG. 12 is a representation in perspective according to a partially cutaway view of another variant of the pushbutton in accordance with the present invention.

An embodiment has been described above, in detail, of a control device with several stable positions, which is used in a cigar lighter. However, numerous variants of this embodiment can be conceived of. FIGS. 11 and 12, by way of example, illustrate another variant of this embodiment.

Thus, according to this variant, instead of, as was described above, the gripping button 28 being equipped with countersunk clips 26, serving as an axial end stop for the finger 25, the gripping button 28 can be produced in two pieces: a cap 58 and a ring 60.

In this case, the retaining structure 40 and its groove 42 are replaced by a ring 62 protruding from the outer surface of the finger cylinder 25.

The cap 58 is formed by a cylinder closed off at one end by a transverse wall 29 similar to that already described. The cap 58 includes two hooks 64 turned so as to project from the outer surface of the cylinder.

The ring 60 of the cap 58 is formed by a cylinder the wall of which is equipped with two apertures 66. The hooks 64 and the apertures 66 interact to form an assembly means of the clip type. One of the open ends of the ring 60 is narrowed, so as to retain the finger 25 level with the ring 62. Hence, the cap 58 and the ring 60 form a cage in which the finger 25 is held captive when the hooks 64 are in engagement with the apertures 66.

Numerous other means, such as screwing, bonding, ultrasonic welding, etc., may be envisaged for assembling the cap 58 and the ring 60.

A plastic collar 68 is placed around the gripping button 28. This collar 68 is intended to take up the radial forces which the user is likely to impose when the gripping button 28 comes in abutment against an external cylindrical guide 70 of the heating plug 6.

The guide 70 is made of transparent or translucent plastic in order to serve as a light guide.

According to yet further variant, the number of cam tracks 48 and of studs 38 may be other than two.

I claim:

1. A control device with several stable positions comprising a cam and a finger, the finger traveling along a cam track around the cam, when the finger and the cam are moved with respect to one another in translation, the cam track exhibiting curvature about an axis of rotation parallel to the axis of the translation in order, during the translation, to move the finger and the cam in rotation with respect to one another, wherein the finger and the cam consist respectively of a cylindrical ring, these two rings being coaxial and capable of a rotational movement with respect to one another, along the axis of rotation.

2. The control device of claim 1, wherein the finger is guided on the cam track by virtue of a stud mounted on an elastic tab made of the same material as the ring on which it is located.

3. The control device of claim 1, which comprises at least one end stop for taking up the substantial forces exerted on the device, along the translation axis.

4. The control device of claim 1, which includes a spring providing a permanent force for bringing the finger into abutment on the cardioid cam, in the stable positions.

5. A cigar lighter intended to be mounted on a dashboard, especially of a motor vehicle, comprising a power-supply body and a removable, heating pushbutton including a pushing surface, the button being able to occupy a first position in the unit, in which it is at least partly projecting with respect to the sweep of the dashboard, in order to be able to be grasped and extracted from the unit, and a second position in which the button can be heated, wherein the button is, moreover, able to take up a third, stable position in which it is not heated and where the pushing surface follows the sweep of the dashboard.

6. The cigar lighter of claim 5, wherein the pushbutton is in three parts which are a gripping button, a finger and a cam.

7. The cigar lighter of claim 5, which includes a cam and a finger, the finger traveling along a cam track around the cam, when the finger and the cam are moved with respect to one another, in translation, and wherein the cam track features a curvature around an axis of rotation parallel to the axis of the translation for moving the finger and the cam in rotation with respect to one another during the translation.

8. The cigar lighter of claim 5, wherein the finger and the cam respectively consist of a cylindrical ring, these two rings being coaxial and capable of a rotational movement with respect to one another, along the axis of rotation.

9. The cigar lighter of claim 5, wherein the finger is guided on the cam track by virtue of a stud mounted on an elastic tab made of the same material as the ring on which it is located.

10. The cigar lighter of claim 5, which comprises at least one end stop for taking up the substantial forces exerted on the device, along the translation axis.

11. The cigar lighter of claim 5, which includes a spring providing a permanent force for bringing the finger into abutment on the cardioid cam, in the stable positions.

12. The cigar lighter of claim 6, wherein the gripping button is fixed to the finger with the aid of a pivot link formed by virtue of countersunk clips.

13. The cigar lighter of claim 6, wherein the finger is held captive in a cage formed by a ring and a cap.

14. The cigar lighter of claim 6, which comprises a collar for taking up the radial forces which the user is likely to impose when the gripping button comes into abutment against a cylindrical outer guide of the heating plug.

* * * * *